United States Patent [19]
Double

[11] 3,736,548
[45] May 29, 1973

[54] ELECTRICAL COUPLER
[76] Inventor: Richard L. Double, Long Beach, Calif.
[22] Filed: July 28, 1971
[21] Appl. No.: 166,701

[52] U.S. Cl. ............339/31 R, 339/132 R, 339/94 A
[51] Int. Cl. .................................................H01r 13/52
[58] Field of Search.....................339/125, 102, 94, 339/132, 31; 103/87; 310/87; 174/77, 65, 163; 166/68, 105

[56] References Cited
UNITED STATES PATENTS

| | | | |
|---|---|---|---|
| 2,750,436 | 6/1956 | Richter | 339/94 A X |
| 3,084,210 | 4/1963 | Bluth et al. | 339/94 R X |
| 3,242,360 | 3/1966 | Carle | 310/87 |

FOREIGN PATENTS OR APPLICATIONS

| | | | |
|---|---|---|---|
| 250,741 | 4/1926 | Great Britain | 339/31 R |

*Primary Examiner*—Richard E. Moore
*Attorney*—Georges A. Maxwell

[57] ABSTRACT

An electrical connector structure establishing bonded and sealed engagement with the lower end of an elongated submersible electric power conducting cable and engageable with submersible, electric oil well pumps, said connector being engageable with different makes of oil well pumps having distinct power cable connecting means parts and/or portions.

8 Claims, 10 Drawing Figures

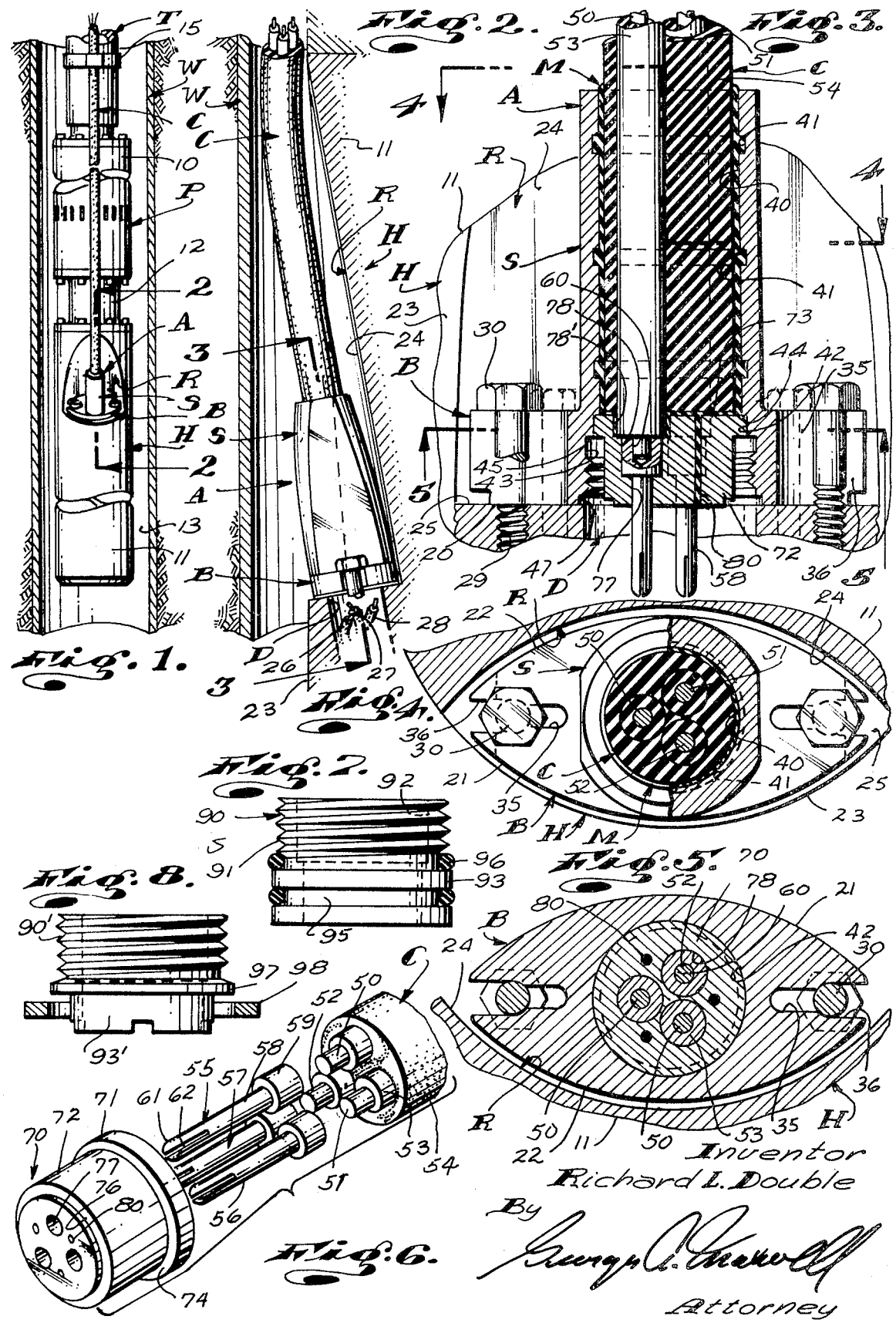

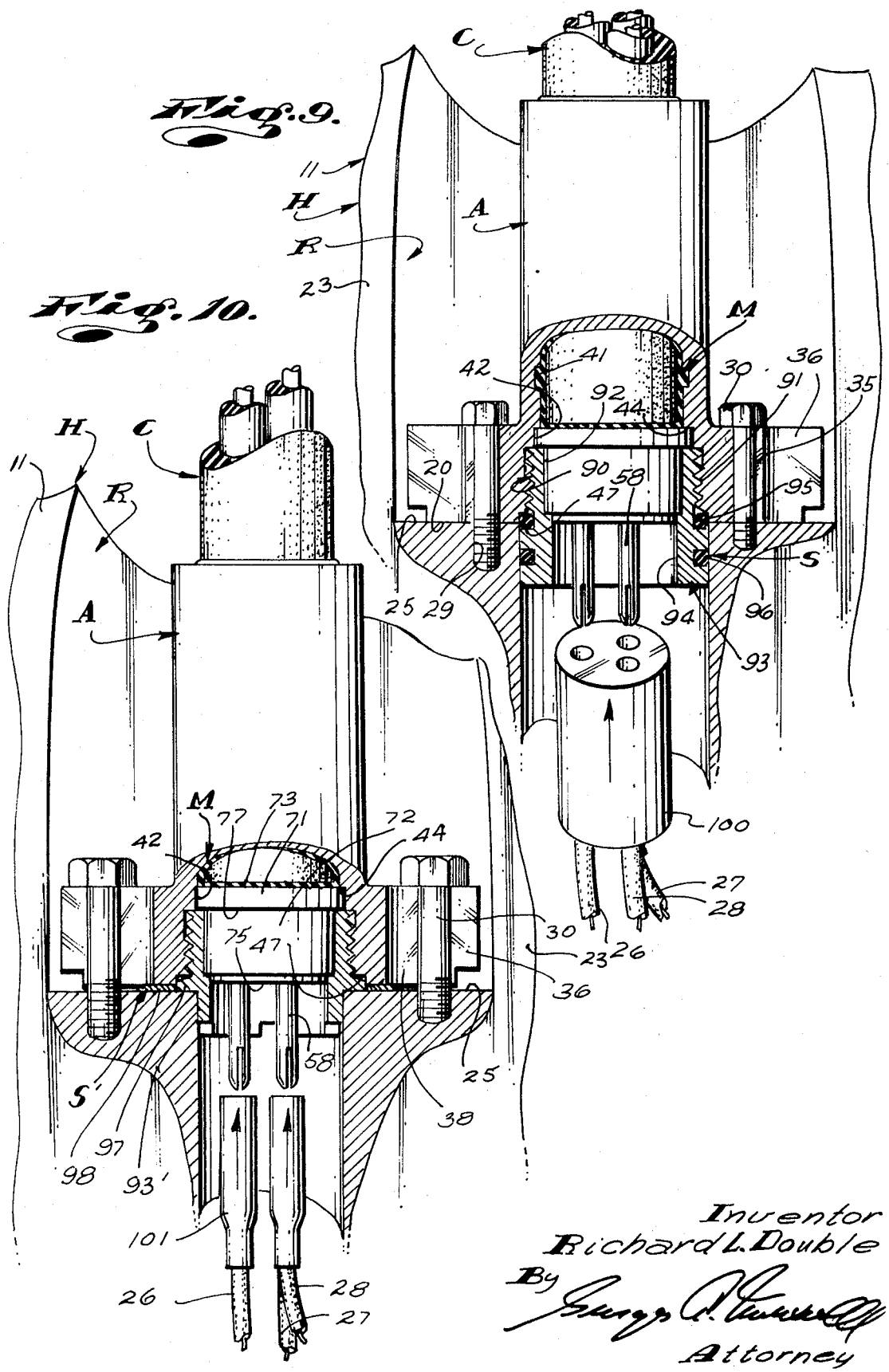

ELECTRICAL COUPLER

This invention has to do with that type or class of electrical connector structure employed in connection with submersible pumps and which are commonly referred to as "pot-heads."

In the art of electrically powered submersible oil well pumps, the pumps are engaged on the lower ends of strings of production tubing which extend through cased well structures and terminate in or in close proximity to liners in the production zones which are tapped by the wells and so that the pumps occur in the production fluids or oil, which flow into the liners. The pumps are provided with electric drive motors which motors are supplied with electric current by means of elongate insulated power cables depending from the tops of the wells parallel with and in the annulus between the production tubings and their related casings. The lower ends of the power cables have three conductor leads which connect with the motors at the openings in the sides of the drive motor housings.

Due to the high temperatures and pressures of the fluids in the wells and about the connections between the power cables and the motors, special, fluid tight heat resistant connecting means must be provided.

The connecting means which has been established and adapted by the two principal manufacturers of electrical oil well pumps include radially outwardly opening recesses in the sides of the pump motor housings which recesses have upwardly and radially outwardly disposed, inclined bottom surfaces and upwardly opening junction chambers entering said bottom surfaces and into which pairs of conductor lines and ground lines from the motor extend. Such connecting means next include connector structures or "pot-heads" fixed to the lower ends of the cables, which pot-heads are adapted to be arranged in the recesses of the motor housings, releasably secured to the bottom surfaces of said recesses and in sealed engagement with said surfaces and/or the chambers related thereto. The pot-heads are such that the conductor and ground leads of the cables can be suitably connected with the conductor and ground lines of the motors.

The pot-heads receive their name by the fact that they include metal bodies into which the insulated cables extend and with which the cables are "potted" or vulcanized to assure a tight, secure, leak-proof relationship between the bodies and the cables.

The recesses in the sides of the pump motor housings and the inclination of the bottom surfaces thereof has been adopted by the art so as to accomodate the pot-heads at the lower ends of the power cables and since there is generally inadequate space in the annulus between the motor housings and the casings and/or liners with which the pump structures are related to accomodate the pot-heads.

So as to minimize the extent of the noted recesses and the size or extent of the pot-heads, the pot-heads include inverted T-shaped bodies with upwardly and radially outwardly inclined tubular stems in which the cables are entered and laterally outwardly projecting mounting flanges, with fastener receiving openings, to engage the bottom surfaces of the recesses. The flanges extend laterally and normal from the radial planes of the pump motor housings on which the pot-heads occur and have radially inwardly and outwardly disposed curved sides. The radially outwardly disposed sides of the flanges are substantially concentric with the exterior of the motor housings, which housings are cylindrical.

The upwardly and radially outwardly inclined surfaces of the recesses are concave so as to cooperatively receive the inwardly disposed curved sides of the flanges of the pot-heads.

The size or extent and the basic configuration of the motor housings recesses and the pot-head bodies provided in and for the two most widely used electric oil well pumps are substantially alike, while the size or extent of the terminal chambers in the housing of said pumps, the lateral spacing and size of the fastener openings, the means employed to connect related leads and lines and the sealing means between the pot-head bodies and the motor housings are distinct or different. As a result of the above, special power cables with distinct and special pot-heads must be provided for the two most widely used electric oil well pumps.

As a result of the above, oil production companies must either purchase and use but one make of pump and thereafter maintain a supply of the special power cables therefor or purchase and use both of the referred to makes of pumps and thereafter maintain supplies of the two different special forms of cables therefor.

Further, the manufacturers of the two most widely used electric, submersible oil well pumps provide and sell short sections or lengths of flat, thin, ribbon-like, armor jacketed electric conductor cable with their special pot-heads thereon, which flat conductor cables are adapted to extend upwardly beyond the upper end of the pump structures and to then connect with round insulated power cables of standard size and construction.

The flat cables referred to above are extremely costly and are provided for those special instances where thrre is insufficient space in the annulus between pump and its related casing and/or liner to accommodate standard, relatively inexpensve, round conductor cable.

The manufacturers of the two most widely used pumps of the character referred to do not provide pot-heads along and do not provide pot-heads which will accept standard round power cables and which would be readily accommodated between the pumps and the well casings or liners in significant number or a majority of installations.

An object and feature of my invention is to provide a novel pot-head structure of the general character referred to which is such that it can be easily, quickly and economically established or set to be cooperatively engaged and related to either one or to the other of the two most widely used submersible oil well pump structures.

It is an object and feature of my invention to provide a pot-head structure of the character referred to which is such that it can be related directly to standard, round, conductor cable whereby supplies and users of such cables need employ but one basic pot-head structure and need not purchase and/or maintain supplies of short, costly, flat armored sections of cables with special and distinct pot-heads fixed thereto.

In the oil production industry, adjacent sections or lengths of standard round power cable are connected together and are sealed by suitable portable vulcanizing apparatus in the field.

An object and feature of my invention is to provide a pot-head structure of the character referred to which is compatible with the above noted portable vulcanizing apparatus whereby the pot-head structure can be related, fixed to and sealed with a cable in the field.

It is an object and feature of my invention to provide a structure of the character referred to which is such that by the easy and convenient substitution of one small, simple and inexpensive part for another part of like character, the structure can be satisfactorily and effectively related to one or the other of the two most widely used pump structures.

It is an object and feature of my invention to provide a structure of the character referred to which is easy and economical to make and to use, a structure which is superior to structures of a similar nature provided by the prior art and a structure which is rugged, durable and highly effective and dependable in operation.

A feature of this invention is to provide a structure of the character referred to comprising an easy and economical to make tubular body to sealingly receive and secure an end portion of a conductor cable and having novel flange-type mounting means to selectively cooperatively engage with different conductor fitting mounting parts of different standard makes of electric pump structures, connector pins engageable with conductors of the cable, a block part to carry and support the pins engageable in the body, and interchangeable adapter rings selectively engageable with the body and block to orient and sealingly secure the block in the body and each adapted to cooperatively engage with a related pump structure to afford connecting the pins with electrical means of the pump.

The foregoing and other objects and features of my invention will be fully understood and will become apparent for the following detailed description of typical preferred forms and applications of my invention, throughout which description reference is made to the accompanying drawings, in which:

FIG. 1 is an elevational view of an electric, submersible, oil well pump arranged in a well structure;

FIG. 2 is an enlarged view of a portion of the structure shown in FIG. 1 and taken substantially as indicated by line 2—2 on FIG. 1;

FIG. 3 is an enlarged detailed sectional view taken as indicated by line 3—3 on FIG. 2;

FIG. 4 is a sectional view taken as indicated by line 4—4 on FIG. 3;

FIG. 5 is a sectional view taken as indicated by line 5—5 on FIG. 3;

FIG. 6 is an exploded isometric view of a portion of the structure that I provide;

FIG. 7 is a view of one selectively used part of my new structure;

FIG. 8 is a view of another selectively used part;

FIG. 9 is a view similar to FIG. 3 showing my new structure with the part shown in FIG. 7 related to it; and FIG. 10 is a view similar to FIG. 9 showing the part illustrated in FIG. 8 related to it.

Referring to FIG. 1, I have shown an electric, submersible oil well pump P arranged in a well structure W. The pump P includes a pump section 10 fixed to the lower end of a string of production tubing T, a motor section 11 below and in alignment with the section 10 and a seal section 12 between the sections 10 and 11.

The motor section 11 includes an elongate, vertical, cylindrical housing H with a recess R on one side thereof and in which a pot-head connector A at the lower end of a power cable C is arranged and fixed.

The assembled structure described above is arranged within a cased and lined well structure W, to occur with or submerged in production fluid therein and with the cable C extending upwardly from the motor section 11 in the annulus 13 between well casing or liner 14 and the pump and tubing. The cable C above the pump P is secured to and supported by the tubing by spaced clamps 15, one of which is shown in FIG. 1 of the drawings.

The pump structure and its relationship with the cable C and well structure W, illustrated in the drawings and described above is illustrative and is typical of those electric, submersible oil well pumps produced and sold by Reda of Bartlesville, Oklahoma and Byron Jackson of Tulsa, Oklahoma.

The electric submersible oil well pumps produced by the above noted manufacturers are the most common and widely used pumps of the class of submersible pumps here concerned with.

In addition to the above noted basic nature and characteristics of submersible pumps, the pumps produced by the above noted manufacturers and by certain other manufacturers of such pumps and by manufacturers of replacement parts for such pumps, have or include another common and similar features, that is, the outer cylindrical housings H of the motor sections 11 are provided with laterally outwardly opening recesses R, which communicate with electrical junction chambers D in the housings and in which electrical connectors, such as pot-heads on related power cables for the pumps are arranged.

The recesses R are required since there is inadequate space in the annulus between the pumps and their related well casings and/or liners to accommodate the pot-heads and since it is desirable to arrange the pot-heads within the housings in such a manner that they are protected and so that they do not project from the pumps in such a manner that they might catch and become hung-up in the well structures as the pumps are lowered into or pulled from the well structures.

As a result of the above and since the size or relative dimensions of and the tolerances between various elements, parts and components of and within well structures have become standardized, the recesses R and the pot-heads referred to above have taken on certain common, basic characteristics. The pot-heads, like the pot-head A that I provide and illustrated in the drawings, include inverted T-shaped bodies having upwardly projecting stem portions S and base portions B at the lower ends of the stems and defining diametrically opposite outwardly projecting flanges. The base portions B have flat bottoms 20 and curved opposite sides 21 and 22. The curvature of the sides 21 and 22 is generally equal or close to the same radius as the pump motor housings H and so that when the pot-heads are engaged in the recesses, their outwardly disposed sides do not project outwardly from and are coincidental with or in close proximity with the exterior surfaces 23 of the housings.

The recesses R have inner walls or surfaces 24, which surfaces are curved about a common axis with the inwardly disposed sides of the base portions B bodies and are slightly greater in radial extent than the inner sides of the base portions, so that no more stock need be removed from the housings H than is necessary and so that the recesses provide maximum protection for the pot-head bodies.

Since the power cables C must be directed and extend upwardly and outwardly from the recesses R, into the annulus 13 between the pumps and their related casings and since the cables are extremely stiff, the recesses R are radially outwardly and upwardly inclined so as to most effectively and efficiently receive the lower ends of the cables and the stem portions of the pot-heads and define flat radially outwardly inclined, or radially upwardly and outwardly disposed bottom surfaces 25, which surfaces correspond generally with, but are generally slightly larger than the plane configuration of the base portions B of the pot-heads. The surfaces 25 of the recesses R and the bottoms 20 of the pot-heads establish flat, opposing, bearing engagement with each other.

The stem portions S are tubular and open upwardly to receive the lower ends of the cables C and are as small in outside diametric extent as is practical. The stem portions S are preferably tapered upwardly and radially inwardly so that their upper outer ends project into the annulus 13 of their related well structures as little as is possible and so they present as little an obstruction in the well structure as is possible.

The electrical junction chambers D opening centrally in the mounting surfaces 25 of the recesses and accommodate two conductor lines 26 and 27 and a ground line 28 for the motor with the housing (not shown).

The chambers D are esablished by a suitably drilling or boring operation and are straight and cylindrical.

The diameter of the chambers D in the different makes of pumps are ordinarily dissimilar or different. The chambers D in the Byron Jackson pump, as illustrated in FIG. 9 of the drawings is larger than the chamber D in the Reda pump, as illustrated in FIG. 10 of the drawings.

The base portions B of the pot-heads provided for the Byron Jackson and Reda pumps have fastener receiving openings which register with complimentary fastener receiving openings 29 in the surfaces 25 of the recesses R, and through and into which suitable bolt fasteners 30 are engaged to urge and hold the pot-heads in tight fixed relationship in the recesses and on the mounting surfaces 25 of said recesses.

In the Reda pump and pot-heads, the bolts 30 and their related openings in the base portions B and recesses R are smaller in diameter and are spaced closer together than are the bolts 30 and openings in the Byron Jackson pot-heads and pumps.

In the Byron Jackson structure, the heads A have downwardly projecting tubular sleeves which slidably enter the chambers D of related pump motor housings, which sleeves carry O-ring seals to seal with and between the bores of the chambers and the sleeves.

In the Reda pot-heads, the heads have downwardly projecting tubular sleeves which slidably enter the chambers D of their related pump motor housings and about which a malleable metal or lead sealing ring is engaged to seal between the surfaces 20 and 25 and about the sleeves when the pot-heads are urged and fixed in place.

Except for the above, specifically noted distinctions of the Byron Jackson and Reda structures are, so far as the instant invention is affected or concerned, essentially the same.

In both the above noted structures, the upper ends of the stem portions of the pot-heads are flattened and the openings thereon are semi-rectangular or flattened to cooperatively receive the lower end portions of flat, wide, ribbon-like armored power cables.

The cables in the above noted structures extend downwardly through the stem portions and are potted and vulcanized thereon. The cables have three conductor leads which extend through the sleeves on the pot-heads to connect with the lines 26, 27 and 28 in the Chambers D of the related housings H.

In the case of the Byron Jackson construction, the leads of the cable are connected with a suitable male section of a jack connector means and the lines 66, 27 and 26, are connected with the female section of the jack connector means; while in the case of the Reda construction, the leads extend freely from the pot-heads into the chambers D and are twist connected with the lines of the pump motor.

Referring now to the pot-head provided by the present invention, the flange-like portions of the base portions B have elongate radially outwardly, upwardly and downwardly opening fastener receiving slots with inner portions 35 with rounded inner ends to cooperatively register with bolt openings 29 and to accommodate and receive the bolts 30 of the noted Reda construction and have outer portions 36 greater in lateral extent than the inner portions 35, with radiused inner ends to cooperatively register with the bolt openings 29 and to accommodate the bolts 30 of the noted Byron Jackson construction.

With the base portions B that I provide, the slots can be established as by casting (when the body is cast), eliminating costly machining and/or drilling operations such as are required to establish the fastener receiving openings in the structures provided in the prior art. The slots further effect a reduction in the amount of metal used.

The stem portion S of the body of my new structure is characterized by a straight, central, longitudinally extending, upwardly opening cylindrical passage 40 with longitudinally spaced, radially inwardly opening channels 41. The passage 40 is adapted to freely and slidably receive the lower end portion of the cable C and to allow for the free flow of a suitable potting material between the cable and the walls of the passage and into the channels.

The lower end of the passage 40 communicates with the bottom of a cylindrical counter bore 42 extending upwardly from the bottom of a downwardly opening cylindrical socket 43 which enters the bottom 20 of the base portion B. The socket 43 and the counter bore 42 are concentric with the passage 40. The counter bore and the passage cooperate to define an annular downwardly disposed stop-shoulder 44 and the socket and the counter bore cooperate to define an annular downwardly disposed shoulder 45.

The socket 43 is provided with female threads as at 46 and is relieved about its lower end by a downwardly and radially inwardly opening annular relief groove 47.

The passage 40 and grooves 41 are preferably established when the body is cast. The counter bore and the socket 42 and 46, with the shoulders 44, 45, threads 46 and relief groove 47 are established by suitably machining operation.

The cable C is a standard, high capacity, submersible electric cable and includes three conductor wires 50, 51 and 52, two of which serve as power conductors and the third or other of which serves as a ground line. The wires 50, 51 and 52 are provided with suitable insulating jackets 53. The three insulated wires are arranged within and carried by a cylindrical casing 54 of rubber or synthetic rubber-like material, such as Neoprene. The casing 54 is slightly less in diameter than the passgge 40 in the body. The lower terminal end of the casing is cut and trimmed to define a flat lower end and so as to leave lead end portions of the jackets 53 of the wires depending from the casing. The lead end portions of the jackets 53 are cut and trimmed to define flat lower ends and so as to leave lead end portions of their related wires 50, 51 and 52 depending therefrom. The lead ends of the jackets and of the wires are of predetermined longitudinal extent.

The structure that I provide next includes three elongate, vertical, jack-like connector pins 55, 56 and 57 to be related to the wires 50, 51 and 52, respectively. The pins have lower cylindrical portions 58 substantially similar in diameter with the wires and enlarged upper cylindrical heads 59 slightly smaller in diameter than the wire jackets and having upwardly opening wire openings 60 in which the lower leaded ends of the wires are pressed and tightly fitted. The lower ends of the lower portions 58 of the pins are preferably mounted as at 61 and slotted, as at 62.

The construction that I provide next includes an elongate, cylindrical block 70 of insulating material, such as Teflon which is engaged in the socket 43 and counter bore 42 and which cooperatively receives and holds the pins and the lead ends of the wire jackets 53.

The block 70 has an enlarged, flange-like upper orienting portion 71 corresponding in axial and diametric extent with the counter bore 42 and press fitted therein, and has a lower, cylindrical portion 72, smaller in diameter than the socket 43, and substantially equal in axial extent with the socket and depending freely in the socket in predetermined spaced relationship with the sides and the threads of the socket.

The upper orienting portion 71 has a flat top surface 73 which stop against the stop shoulder 44 in the counter bore 42 and defines a flat downwardly disposed shoulder 74 which is flush with the shoulder 45 in the socket. The lower portion 72 of the block has a flat lower end 75.

The block 70 has three circumferentially spaced axially extending passages 77 entering its lower end 76 and through which the pins 58 are slidably engaged. Each opening has an enlarged bore 78 at its upper end in which the lead end of the jacket 53 of its related cable wire is slidably engaged and seated and has a counter bore 79 corresponding in axial and diametric extend with the the heads 59 of the pins and in which the heads of the pins related to passages are slidably engaged and seated.

Finally, the block 70 is provided with one or more axially extending vent openings 80 extending between its upper and lower ends and through which the potting material can flow. The openings 80 are provided so that the potting material M, which is introduced into the passage 40 at the upper end can flow freely through the construction and its flow is not interfered with or impeded by air trapped with the construction. When the potting material is introduced into the construction and it commences to flow from the lower ends of the openings 80, it is assured that the construction is properly potted.

It is to be noted that the potting material, in addition to flowing about the sides of the cable, through the passage and into the grooves 41 also flows between the top 73 of the block and the lower end of the cable casing.

The potting material M is such that it welds with the cable casing and is such that when it is cured, as by vulcanizing, it establishes an intimate bond with the walls of the passage 40 and in the grooves 41, establishing an extremely strong, durable and fluid tight connection with and between the cable and the body.

Finally, my new structure includes an elongate, annular adapter ring 90 having an extremely threaded upper portion 91 with a central upwardly opening cylindrical cavity 92 and a lower annular sleeve portion 93.

The upper portion 91 is threaded into the socket 46 and to a point where it engages and stops against the shoulders 45 and 74. The cavity 92 corresponds in axial and diametric extent with the lower portion 72 of the block 70 and slidably receives the portion 72 of said block, with the lower end of the of the block, stopped against the lower end of the cavity when the ring is fully engaged in the socket.

The lower annular sleeve portion 93 of the adapter ring is adopted to slidably enter the cylindrical junction chamber D of a related submersible pump motor housing and defines a cylindrical space 94 below the block 70 into which the lower portion of the pins 58 freely project and into which a female plug part related to the lead wires from the pump motor can be slidably engaged or into which the lead wires from the related pump motor can extend to connect with the pins.

In addition to the above, the adapter ring 90 carries and has related to it, sealing means S to seal about the ring and between the opposing bottom surfaces 25 and 20 of the pot-head body and the recess R in the pump motor housing.

The structure thus far described, including the adapter ring and sealing means, to the extent described, is the basic and substantially complete construction provided by the present invention.

In practice, and to adapt the above construction to the two noted forms of submersible pumps, the lower sleeve portion of the adapter rings and the sealing means S are, as shown in FIGS. 7 through 10 of the drawings, modified or changed.

As shown in FIG. 7 and 9 of the drawings, the sleeve portion 93 of the adapter ring 90 is larger in outside diameter than the skirt portion 93' of the ring 90' in FIG. 8 and 10 of the drawings. The sleeve portion 93 of the ring 90 is adapted to slidably enter the cylindrical chamber D of a Byron Jackson pump while the portion 93' of the ring 90' is adopted to slidably enter the chamber D of a Reda pump.

The sealing means S in the form of the invention shown in FIG. 7 and 9 of the drawings includes a pair of axially spaced, annular, radially outwardly opening sealing ring grooves 95 in the sleeve portion of the ring and sealing rings 96 in said grooves. The lower most of the two sealing rings seals with the wall of the chamber D in which the sleeve 93 is engaged while the upper most of the two sealing rings occurs on the plane of the opposing suraces 20 and 25 and seals in and with the relief groove 47 in the pot-head body and with the adjacent upper end portion of the chamber D.

The sealing means S' in the form of the invention shown in FIG. 8 and FIG. 10 of the drawings includes a radially outwardly projecting back-up flange 97 on the upper end of the sleeve 93' to occur in the relief groove 47 and an annular, maliable metal or lead washer-like sealing ring 98, greater in outside diameter than the flange 97, slidably engaged about the sleeve 93' and in right, clamped sealing engagement about the sleeve and between the surface 25 of the recess R and the opposing surface of the flange 97 and surface 20 of the pot-head body.

The two forms of adapter rings and sealing means that I provide are extremely inexpensive assemblies and are such that both forms of these sub-assemblies can be advantageously provided with each pot-head whereby the pot-head can be advantageously engaged and related to either of the noted pump structures.

In the Byron Jackson pump, the lead wires 26, 27 and 28 of the pump motor are, as shown in FIG. 9 of the drawings, connected with a female socket part 100 to engage the contact pins of the pot-head.

In the case of the Reda pump construction, the lead wires 26, 27 and 28 are ordinarily twist connected with extended lead ends of the wires of the cable C, which extend through and from the pot-head. To effect cnnection of the lead wires 26, 27 and 28 of the Reda pump with their appropriate contact pins of my pot-head standad, crimp-on connector sleeves 101, such as shown in FIG. 10 of the drawings and which are commonly provided on the lead wires in Reda pumps are engaged on the pins.

It is to be noted and understood that my new pot-head structure is not limited for use in submersible oil well pumps, but can be used in connection with submersible electrical appliances of any sort and where a connector such as here provided can be used to advantage.

Having described only typical preferred forms and applications of my invention, I do not wish to be limited or restricted to the specific details herein set forth, but wish to reserve to myself any modifications and/or variations that may appear to those skilled in the art.

Having described my invention, I claim:

1. An electric connector structure of the character referred to including a metal body with an upper elongate vertical stem portion and a lower base portion with a flat bottom; a longitudinally extending passage with longitudinally spaced radially inwardly opening channels in the stem portion, a downwardly opening internally threaded socket entering the bottom of the base portion and a counter bore between and communicating with the socket and the passage, a block of insulating material with an upper flange portion engaged and seated in the counter bore and a lower portion depending through the socket in spaced relationship from from the threads, a plurality of circumferentially spaced, elongate connector pins carried by the block and having lower portions projecting downwardly from the block and having enlarged head portions with conductor wire openings accessible at the upper end of the block, an elongate adapter ring with an externally threaded upper portion slidably engaged about the lower portion of the block and threadedly engaged in the socket and into stopped sealed engagement with the flange portion of the block and a lower, cylindrical, annular, skirt portion depending from the upper portion of the ring and the base portion of the body and through which the pins freely project, said skirt portion adapted to enter a chamber entering a flat upwardly disposed surface of a related structure opposing the bottom of the base and carrying sealing means about its exterior to seal between the skirt portion and said related structure, an elongate vertical power cable with a rubber like casing and a plurality of circumferentially spaced jacketed conductor wires extending longitudinally through the casing and having lead ends projecting from the lower end of the casing, the lower end portion of the casing engaged in and extending longitudinally of the passage, the lead ends of the wires engaged in the wire openings in the pins and a body of potting material welded to the exterior of said lower portion of the casing and bonded with the surfaces of the passage and in the channels.

2. A structure as set forth in claim 1 wherein said base portion of the body has oppositely disposed flanges, projecting radially outwardly from the lower end of the stem portion, said flanges having upwardly, downwardly and radially outwardly opening screw fastener receiving slots with inner portions having flat vertical opposing sides and radially outwardly disposed bottoms and outer portions greater in lateral extent than the inner portions and having vertical opposing sides, said slots adapted to register with fastener receiving openings in the noted surface of the related structure and to accommodate headed screw fasteners engaged in said fastener receiving openings, whereby said fasteners are operable to urge and hold the body adjacent said surface of the related structure.

3. A structure as set forth in claim 1 wherein said block has sockets entering its upper end and in which portions of the wire jackets depending from the casing are engaged and counter bores depending from the bottom of said sockets, said pins having enlarged head portions engaged and seated in the counter bores, said wire openings entering and extending into said head portions.

4. A structure as set forth in claim 1 wherein said base portion of the body has oppositely disposed flanges projecting radially outwardly from the lower end of the stem portion, said flanges having upwardly, downwardly and radially outwardly opening screw fastener receiving slots with inner portions having flat vertical opposing sides and radially outwardly disposed bottoms and outer portions greater in lateral extent than the inner portions and having vertical opposing sides, said slots adapted to register with fastener receiving openings in the noted surface of the related structure and to accommodate headed screw fasteners engaged in said fastener receiving openings, whereby said fasteners are operable to urge and hold the body adjacent said surface of the related structure, said block having sockets entering its upper end and in which portions of the wire jackets depending from the casings are engaged and counter bores depending from the bottom of said sockets, said pins having enlarged head portions engaged and seated in the annular bores, said wire openings entering and extending into said head portions.

5. A structure as set forth in claim 1 wherein said sealing means includes a plurality of longitudinally spaced radially outwardly opening grooves in the skirt portion of the adapter ring, and O-ring seals in said grooves, the upper most O-ring occurring on the plane of the bottom of the base portion of the body to seal with and between the adapter ring, body and the structure, the other O-ring being adapted to seal with and between said skirt portion and the chamber of said related structure.

6. A structure as set forth in claim 1 wherein said base portion of the body has oppositely disposed flanges projecting radially outwardly from the lower end of the stem portion, said flanges having upwardly, downwardly and radially outwardly opening screw fastener receiving slots with inner portions having flat vertical opposing sides and radially outwardly disposed bottoms and outer portions greater in lateral extent than the inner portions and having vertical opposing sides, said slots adapter to register with fastener receiving openings in the noted surface of the related structure and to accommodate headed screw fasteners engaged in said fastener receiving openings, whereby said fasteners are operable to urge and hold the body adjacent said surface of the related structure, said sealing means includes a plurality of longitudinally spaced radially outwardly opening grooves in the skirt portion of the adapter ring, and O-ring seals in said grooves, the uppermost O-ring occurring on the plane of the bottom of the base portion of the body to seal with and between the adapter ring, body and the structure, the other O-ring being adapted to seal with and between said skirt portion and the chamber of said related structure.

7. A structure as set forth in claim 1 wherein said block has sockets entering its upper end and in which portions of the wire jackets depending from the casing are engaged and counter bores depending from the bottom of said sockets, said pins having enlarged head portions engaged and seated in the counter bores, said wire openings entering and extending into said head portions, said sealing means includes a plurality of longitudinally spaced radially outwardly opening grooves in the skirt portion of the adapter ring, and O-ring seals in said grooves, the upper most O-ring occurring as the plane of the bottom of the base portion of the body to seal with and between the adapter ring, body and the structure, the other O-ring being adapted to seal with and between said skirt portion and the chamber of said related structure.

8. A structure as set forth in claim 1 wherein said base portion of the body has oppositely disposed flange projecting radially outwardly from the lower end of the stem portion, said flanges having upwardly, downwardly and radially outwardly opening screw fastener receiving slots with inner portions having flat vertical opposing sides and radially outwardly disposed bottoms and outer portions greater in lateral extent than the inner portions and having vertical opposing sides, said slots adapted to register with fastener receiving openings in the noted surface of the related structure and to accommodate headed screw fasteners engaged in said fastener receiving openings, whereby said fasteners are operable to urge and hold the body adjacent said surface of the related structure, said block has sockets entering its upper end and in which portions of the wire jackets depending from the bottom of said sockets, said pins having enlarged head portions engaged and seated in the annular bores, said wire openings entering and extending into said head portions, said sealing means includes a plurality of longitudinally spaced radially outwardly opening grooves in the skirt portion of the adapter ring, and O-ring seals in said grooves, the upper most O-ring occurring on the plane of the bottom of the base portion of the body to seal with and between the adapter ring, body and the structure, the other O-rings being adapted to seal with and between said skirt portion and the chamber of said related structure.

* * * * *